UNITED STATES PATENT OFFICE.

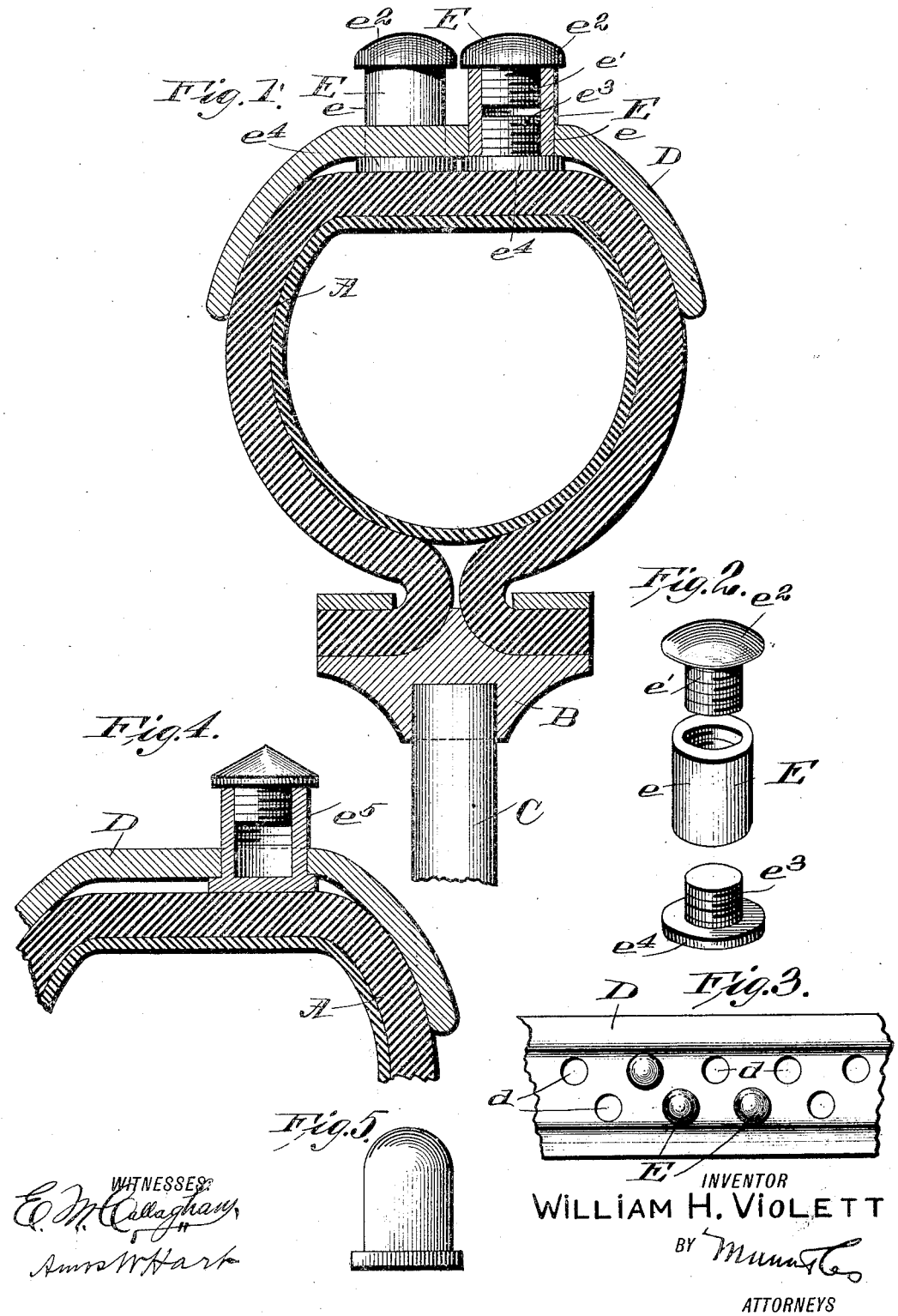

WILLIAM H. VIOLETT, OF MEEKER, COLORADO.

ATTACHMENT FOR ELASTIC TIRES.

No. 832,514.  Specification of Letters Patent.  Patented Oct. 2, 1906.

Application filed September 19, 1905. Serial No. 279,202.

*To all whom it may concern:*

Be it known that I, WILLIAM H. VIOLETT, a citizen of the United States, residing at Meeker, in the county of Rio Blanco and State of Colorado, have made certain new and useful Improvements in Attachments for Automobile and Bicycle Tires, of which the following is a specification.

My invention is an improved attachment for rubber tires of automobiles and bicycles, whereby said tires are protected from puncture and wear to which they are ordinarily liable.

The attachment enables rubber-tired wheels to run over rough roads and sharp-edged stones or other obstructions without danger of injury, and it also provides a better hold on the ground than is practicable with smooth tires.

The details of construction, arrangement, and combination of parts are as hereinafter described, and illustrated in accompanying drawings, in which—

Figure 1 is a transverse radial section of an inflated rubber tire provided with my improved attachment. Fig. 2 is a perspective view of certain portions of the attachment disassociated. Fig. 3 is a plan view of the attachment proper. Fig. 4 is an enlarged detail section illustrating a modification. Fig. 5 is a side view of a modified form of plug constituting a part of the attachment.

In Fig. 1, A indicates an inflated rubber tire, which may be of the usual construction and secured in a preferred manner to an elastic tire B, to which the spokes C of the vehicle-wheel are secured. My improved attachment comprises a thin metal tire D, which is practically semicircular in cross-section and extends entirely around the rubber tire A, it being so arranged as to inclose the outer portion of the latter and extend down on the sides thereof to a point a short distance above the middle. The attachment further includes projections E, which are applied to the sheathing or protecting-tire D in such manner as to stand out radially from the periphery of the tire A. As illustrated in Fig. 3, the metal tire or sheathing D is provided with a series of holes $d$, which are arranged "staggering" or one being opposite the space between each two in the opposite row. In each of these openings $d$ is arranged a plug whose construction is illustrated in Fig. 2—that is to say, it consists of a body or metal portion $e$, which is a tube threaded at each end, a screw $e'$, having a rounded head $e^2$, and a base-screw $e^3$, having a flange $e^4$. The tube $e$ is inserted in one of the openings $d$ of the tire D, and the plug $e^3$ is screwed into the lower end of the same, its base-flange $e^4$ thus lying between the protector D and the rubber tire A, as shown in Fig. 1. The plug $e'$ is in a similar manner screwed into the outer end of the tube $e$, as is also indicated in Fig. 1. There is thus provided around the entire supplemental tire or protector D a series of radial projections in the nature of removable plugs, which constitute the true tread of the tire. As shown in Fig. 4, the head $e^2$ of the screw $e'$ may be conical instead of rounded, as shown in Figs. 1 and 2, and the body $e^5$ and flanged base of the plug may be constructed integral, as shown. As shown in Figs. 1 and 4, the outer side of the rubber tire A is flattened, and the sheath or protecting-tire D has a similar construction or form, so that the bases of the plugs rest upon a flat surface. It is to be understood, however, that the tire A may be so constructed that its outer side or periphery will describe in cross-section the arc of a circle or, in other words, may be rounded in place of being flat, and in such case the protector D and the bases of the plugs will be made to conform thereto instead of flattened, as shown.

It is apparent that my improvement renders the rubber tire far more durable than at present, since it prevents it from being worn or punctured, and thus destroyed, as is now so often the case, and, further, that the plugs take such a firm hold on the surface whereon the wheels run that slipping is practically impossible. I desire it understood that I do not propose to restrict myself in all cases to the construction and attachment of the plugs here shown, but to adopt any suitable form and arrangement which will permit the plugs to be inserted and removed as conditions may require. The plugs may, in short, be made solid and without a flanged head, as illustrated in Fig. 5. I desire it further understood that a spring bed or cushion may be provided for plugs between the tire A and the sheathing or protector D and that the plugs may have any form, as round, polygonal, or oval in cross-section, as occasion demands.

Having thus described my invention, what I claim as new, and desire to secure by Letters Patent, is—

1. The combination, with an elastic wheel-tire, of a protector comprising a metal sheath provided with apertures in its peripheral portion, and removable plugs comprising a tubular body portion which is threaded internally, and screws adapted to engage the tube and arranged at the inner end thereof, substantially as described.

2. The improved attachment for elastic wheel-tires comprising an annular metal sheathing which is curved in cross-section and provided with peripheral apertures, and plugs inserted in such apertures and having a flanged base and a body which projects from the sheathing and is threaded internally, and a screw-block inserted in said body, as shown and described.

3. The combination with an elastic wheel-tire and a metal sheathing provided with aperatures, of removable plugs arranged in said apertures and comprising a hollow flanged body, and a detachable end portion, substantially as described.

WILLIAM H. VIOLETT.

Witnesses:
GEORGE E. RITCHIE,
FRED MUNRO.